United States Patent [19]
Wreede et al.

[11] Patent Number: 5,155,605
[45] Date of Patent: * Oct. 13, 1992

[54] ROTATING DISK WITH SPATIALLY STABILIZED IMAGES

[75] Inventors: John E. Wreede, Monrovia; James E. Scott, Los Angeles; Richard B. Upper, Studio City, all of Calif.

[73] Assignee: Hughes Aircraft Company, Los Angeles, Calif.

[*] Notice: The portion of the term of this patent subsequent to Nov. 7, 2006 has been disclaimed.

[21] Appl. No.: 581,440

[22] Filed: Sep. 10, 1990

Related U.S. Application Data

[63] Continuation of Ser. No. 285,180, Dec. 15, 1988, abandoned.

[51] Int. Cl.$^5$ .............................................. G03H 1/26
[52] U.S. Cl. ................................... 359/24; 359/22
[58] Field of Search ................. 350/3.71, 3.77, 3.78, 350/3.79, 3.7; 359/1, 15, 17, 18, 22, 24, 25, 26

[56] References Cited

U.S. PATENT DOCUMENTS

| | | | |
|---|---|---|---|
| 3,627,916 | 12/1971 | Bestenreiner et al. | 350/3.79 |
| 3,721,487 | 3/1973 | Pieuchard et al. | 350/3.71 |
| 3,746,783 | 7/1973 | Gerritsen et al. | 350/3.79 |
| 3,773,401 | 11/1973 | Douklias et al. | 350/3.71 |
| 3,914,544 | 10/1975 | Watanabe et al. | 350/3.79 |
| 3,953,105 | 4/1976 | Ih | 350/3.71 |
| 4,078,177 | 3/1978 | Tiemens | 350/3.77 |
| 4,528,448 | 7/1985 | Doggett | 350/3.71 |
| 4,573,758 | 3/1986 | Hecker et al. | 350/3.71 |
| 4,639,071 | 1/1987 | Matsumoto et al. | 350/3.71 |
| 4,878,719 | 11/1989 | Wreede et al. | 359/24 |

Primary Examiner—Bruce Y. Arnold
Assistant Examiner—David R. Parsons
Attorney, Agent, or Firm—Leonard A. Alkov; Wanda K. Denson-Low

[57] ABSTRACT

A disk cover is provided with a reflection-type hologram assembly having multiple exposure images therein. The sun or an artificial light source illuminates the hologram assembly as it rotates as a result of the body moving. The exposure images are successively reconstructed to produce a single image that may be remotely positioned from and stationary relative to the rotating disk cover.

4 Claims, 2 Drawing Sheets

ROTATING DISK WITH SPATIALLY STABILIZED IMAGES

This is a continuation of application Ser. No. 07/285,180 filed Dec. 15, 1988 now abandoned.

BACKGROUND OF INVENTION

The present invention relates generally to rotating disks and, more specifically, to improved disks that provide spatially stabilized emblematic images which are viewable when the body to which the disk is attached is stopped or moving.

For decades, manufacturers have faced the problem of advertising their products with logos on the products themselves. Perhaps in recognition of the problems or ineffectiveness attendant upon putting logos on disks, as for example, phonograph records, manufacturers have now tended to dispense with logos. One problem with using rotating disks to display a logo is that the logo can become indiscernible when the disk is moving, particularly at moderate to high speeds. Furthermore, even when the disk is moving at very low speeds, the rotation of the disk, and thus the emblematic logo, produces a blurred or rotating image that is not highly desirable. A specific example is the difficulty of reading the label of a phonograph record as it is rotating on a record player. As such, a logo on a rotating disk has provided advertising benefits essentially only when the body to which the disk is attached has stopped, so that it can be viewed by someone directly facing the disk.

Holography has provided a means not only of providing a truly three-dimensional image but also the possibility of animation of these images. The combination giving a full three dimensional image with motion (a 3-D movie) is possible just by making each frame of a movie a true hologram (see for example, paper by Metherell, et al. in *Acoustical Holography*, Vol. 5, by Philip S. Green). Each frame has the standard viewing limitations of a standard hologram and has the same holographic construction limitations of a standard hologram.

There are stereographic movies which exhibit a pseudo three-dimensionality but do give motion with nearly the effectiveness of a hologram since the eye (or two eyes of the viewer) only sees depth as a horizontal function only. Similarly lenticular screen stereograms can give both the appearance of three dimensionality and apparent motion.

There is a holographic technique which combines some of the aspects of stereo viewing and lenticular screen viewing. Holograms of this type were perfected by U.S. Pat. No. 3,515,452 to R. V. Pole, issued Jun. 2, 1970. In a so-called multiplex hologram, a standard camera provides a series of photographs of a three dimensional scene or subject which is either rotating or moving with respect to the camera such that a different aspect is covered in each picture. Each photograph is effectively from a different angle. A hologram is made by projecting each frame (of the two-dimensional movie or still) through a cylindrical lens onto the holographic film. Each frame forms a hologram of the two-dimensional movie frame in a narrow slit. As the hologram is viewed, each eye sees a different holographic view of the two-dimensional object and a 3-D stereogram/hologram is seen. These holograms can either be viewed flat with motion of the viewer's head providing motion (as in the lenticular screen devices) or as a rotating cylinder.

Even though the viewing time (or amount of motion before repeat) is limited for this multiplex hologram and the parallex or three-dimensionality in the horizontal axis only, a three-dimensional image with motion can be viewed.

The present invention is of another format for viewing a three-dimensional image which can, if desired, have motion included.

A need still exists in the art to provide a disk that can produce a substantially nonblurring image of a logo that remains stationary relative to the rotation of the disk.

SUMMARY OF THE INVENTION

The present invention seeks to overcome deficiencies in the prior art by providing a disk that can produce spatially stabilized images, including those of a manufacturer's logo, and to provide new formats for viewing three-dimensional images. A plurality of holograms stacked upon one another, or a plurality of exposures in a single layer of film, or a plurality of pie-shaped holograms disposed in a wheel configuration are utilized for providing substantially a single image of the logo, for example. Another embodiment involves the use of the slit like exposures of a typical multiplex hologram (see for example *Holography Handbook* by Untersehes Hansen and Schlesinger, pp. 288 to 293). In the standard art, the slit like holograms are arranged on a flat plate to form a rectangular hologram compound or onto a cylinder. The difference in this embodiment is that the slit like holograms are arranged in a ring on a rotating disk. Different views, or the same view, can thus be seen as the disk rotates, as opposed to the standard multiplex hologram where a different view is seen as the cylinder rotates. The holograms are of the reflection type that can be illuminated by sunlight or by an artificial light source which can be positioned, for example, to illuminate the hologram. Each hologram is capable of producing the same image as the others, and each has a relatively small reconstruction angle for illumination purposes. Further, each hologram is angularly offset from one another. Thereby, as the disk rotates, the holograms rotate with it and the holograms sequentially become reconstructed to provide substantially one image of the logo. As each frame passes through that angle at which the hologram can be reconstructed through an exit pupil to a viewer in, for example, less than 1/30 of a second, a smooth, uninterrupted image of the logo would appear. The image is seen not only when the body is at a stop, but also as the body rotates in the range of slow to high speeds.

These and other objects of the present invention can best be seen from an examination of the accompanying specification, claims and drawings hereto.

Specific applications of the present invention are for photographic records and compact disks, and outside advertisements with rotating bodies incorporated therein.

DESCRIPTION OF THE PREFERRED EMBODIMENTS

The following description is provided to enable any person skilled in the art to which the present invention pertains, or with which it is most nearly connected, to make and use the same, and sets forth the best mode contemplated by the inventors of carrying out their invention. Various modifications, however, will remain readily apparent to those skilled in the art, since the the generic priciples of the present invention have been defined herein specifically to provide a disk or wheel with spatially stabilized images.

Figure 1:
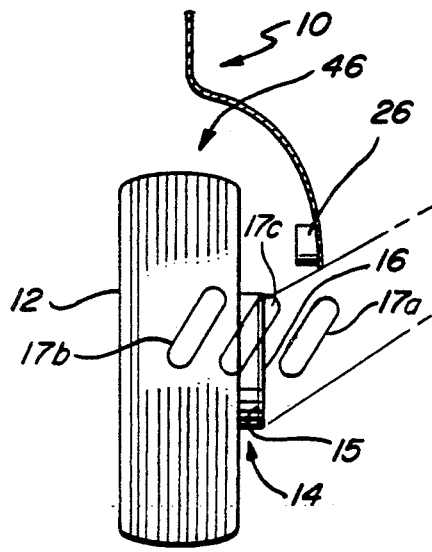
FIG. 1 is a side view of the present invention which can be utilized with a sunlight source or an artificial light source.

FIG. 1 is a side view of the present invention which is incorporated into a commercially standard body 10. Part of the body 10 includes a standard disk 12 having a conventionally designed cover 14 mounted thereon. As in conventional moving bodies, the cover 14 rotates with the disk 12 as the body 10 moves. Also, as with many standard covers, the cover 14 has a flat exterior portion 15 that faces away from the disk 12. The exterior portion 15 is utilized as a support member upon which a hologram assembly 16 can be affixed. Of course, as will be evident from the description below, the cover 14 may be specifically designed to support a particular sized and/or configured hologram assembly 16.

Figure 2:
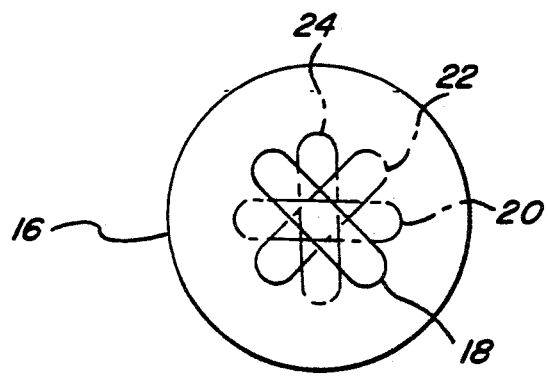
FIG. 2 is a plan view of a hologram assembly according to a first preferred embodiment of the present invention.
Figures 5, 6, 7:
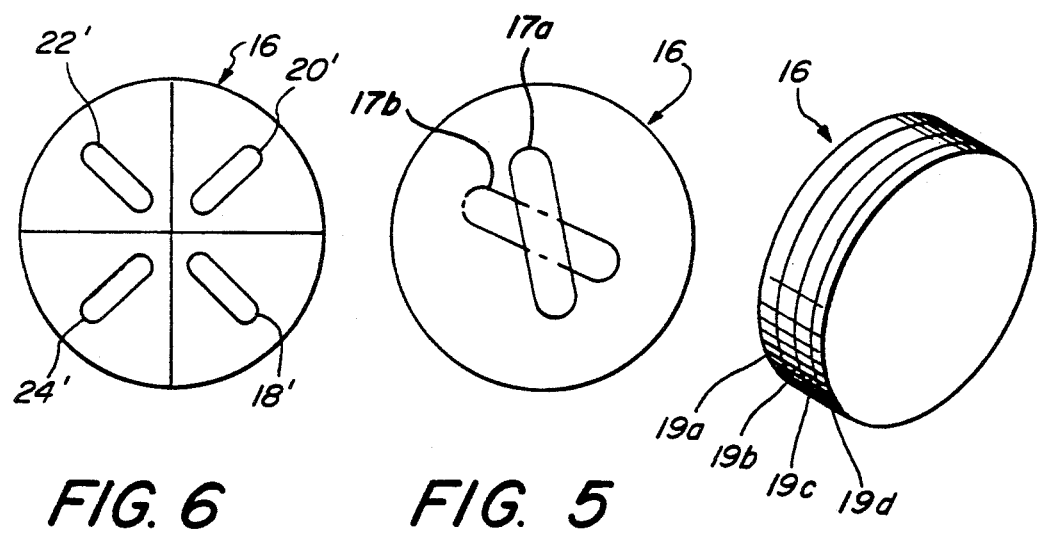
FIG. 5 depicts the movement of a virtual image produced according to the present invention under the conditions of a moving illumination source.
FIG. 6 is a plan view of a hologram assembly according to a second preferred embodiment of the present invention.
FIG. 7 is a perspective view of a hologram assembly according to a third preferred embodiment of the present invention.

The holgram assembly 16 includes, in one embodiment, a plurality of hologram elements stacked upon one another in a multilayered configuration (FIG. 7), further described below, to produce a single three-dimensional image 17 of a body manufacturer's logo, for example. In another embodiment, the hologram assembly 16 is a single hologram element or film with multiple, overlapping exposures (FIG. 2). In yet another embodiment, the hologram assembly 16 includes a plurality of similarly dimensioned pie-shaped hologram elements positioned relative to one another in the form of a wheel (FIG. 6). These pie-shaped holograms need not be full. They may indeed be so thin (approximately 1 mm wide) and truneated so as to be nearly identical in operation to be slits in a cylindrical cross-type multiplex hologram. Each hologram element includes a single exposure which is identical to the others. Furthermore, it is contemplated that instead of individual pie-shaped units, a single hologram is provided with multiple exposures disposed equidistant to each other near a circumferential edge of the hologram and at equal radial distances. However, by having multiple pie-shaped holograms, individual ones can be removed from the assembly 16 and then discarded such as when an individual hologram unit is damaged. Thereby, a replacement unti can be inserted and keep the remainder of the assembly 16 usable. In contrast to a single or layered assembly 16, damage to one section may necessitate discarding the whole assembly 16.

In any of the three embodiments, the image or logo 17 can be a real image 17a, a virtual image 17b, or a part virtual and part real image (i.e., real/virtual image) 17c, as depicted in FIG. 1. Whether the real or virtual or real/virtual image is produced depends on the position of the object (or an image of the object) in the hologram construction system (FIG. 3), as is known in the art.

The real image 17a can be seen by a viewer looking directly at the disk cover 14, i.e., from the right side of FIG. 1. When so viewed, the image 17a appears to be in front of the cover 14. The vitual image 17b can also be seen by the viewer looking directly at the cover 14. In this instance, the logo 17b will appear to be inset in the disk 12. As with the images 17a, b, the real/virtual image 17c can be seen by a viewer looking directly at the cover 14. So viewed, the logo 17c appears to split a plane of the hologram assembly 16. The logo 17c is generally preferable over the other two logos 17a, b, at least to the extent that it more nearly simulates the position of a conventionally designed logo on a disk.

The logo 17 is re-created by illumination of the hologram assembly 16 by either a sunlight source 28 or an artificial light source 26. A well area 46 is described in part by a standard designed interior area of body 10 or may be specifically configured and dimensioned to maximize the amount of sunlight from the source 28 impinging upon the hologram assembly 16. Preferably, the well area 46 is also constructed to enable sunlight to reach the hologram assembly 16 at a maximum number of hours throughout the day.

As an alternative to, or even in addition to, the provision for illumination by sunlight, an artificial light source 26 can be provided within the well area 46 for illumination of the hologram assembly 16. Preferably, the light source 26 is affixed to the interior area and is an extended or point source incandescent lamp which might be powered by a battery conventionally provided in the body 10 or perhaps by a battery source (not shown) immediately adjacent the light source 26. In any event, the artificial light source 26 could be utilized during the evening when the sun is absent, or perhaps during the day when the sunlight source 28 is being blocked, such as by clouds.

As noted above, the hologram assembly 16 can be made up of a plurality of exposures in a single hologram element, such as that depicted in FIG. 2. By way of example, the hologram assembly 16 shown in FIG. 2 includes a first exposure image 18, a second exposure image 20, a third exposure image 22 and a fourth exposure image 24. This type of multiple exposure is well known in the art, as shown and used, for example, in package price reading assemblies that utilize bar code scanners having multiple holographic optical elements. The single hologram element, in this specific embodiment, is a reflection-type hologram such as one that may be produced by glass and dichromated gelatin, as is well known in the art. A transmission-type hologram may also be used, but, as can be appreciated by those skilled in the art, it would not be able to readily utilize sunlight. Since the image 17 need not be of very high quality, the considerations of low cost and mass production can be of more importance. Consequently, other suitable materials for the hologram assembly may include photographic silver halide film (holographic quality), dichromated gelatin, and photopolymers such as DuPont's HRF (holographic recording film) or Polaroid's DMP-128. In mass production, it could be possible to emboss the holographic pattern in a thermoplastic such as vinyl. The assembly 16 might also be placed on a backing of mylar or on the vinyl disk 12 itself. Typical embossing methods that can be employed are shown in references such as *National Geographic*, March 1984, p. 372.

If, instead of multiple exposures, multiple hologram elements are utilized, they may be placed together in a layered fashion, one on top of the other, with each containing an interference pattern or exposure image that can produce the image 17. For purposes of example, FIG. 7 shows four layered hologram elements 19a, b, c, d. The hologram elements can be adhered to one another preferably by polyvinyl butyral, an adhesive used in windshields, or any other suitable optical cement. And as with the single hologram above, the multiple holograms can be constructed of photographic silver halide film, dichromated gelatin, and photopolymers. However, embossing in this instance may not be particularly suitable. Since embossing is a surface effect, the intermediate surfaces in the layered construction might be degraded. If the hologram in the final unit is an embossed hologram and the format is a phonograph record, both embossings can be done at the same time.

In the case of the radially cut or pie-shaped hologram assembly 16 (FIG. 6), the materials utilized could be the same as those for the other embodiments. Further, embossing as above could be employed.

An application in this type of hologram is on the label of a phonograph record. The image displayed can be as simple as the title and name of the artist which (as can be seen from the following discussion) will apparently remain stationary and therefore legible as the disk is rotated. Alternately, the image could be a (very) short sequence showing an object with motion relating to the subject or artist on the record.

In all of the preferred embodiments, each of the hologram elements is produced so that a reconstruction range of illumination angles is limited. In this particular embodiment, the reconstruction range is about 5 degrees or less for the use of four hologram elements or exposures. Also, the exposures, whether in a single, layered, or pie-shaped hologram, are preferably offset with one another in a angular direction (FIGS. 2 and 6) by equidistant amounts.

As such, the hologram assembly 16, whether single, layered, or pie-shaped, is illuminated while it rotates on the disk 12 and produces substantially only a single image 17. In FIG. 2, the first exposure image 18, as well as an image of the logo which is produced, is represented in unbroken lines. The remaining three exposure images 20, 22, 24, as a result of the limited reconstruction angles, are not producing any, or at least not a significant, image of the logo. However, as the hologram assembly 16 continues to rotate, the exposure images will sequentially produce a single image in substantially the same position, which is in front of the disk 12 in the instance of the real image 17a. In FIG. 2, if the hologram assembly 16 were rotating in a counterclockwise direction and the hologram assembly 16 was being illuminated by a stationary light source, the first exposure image 18 would move out of its reconstruction range and discontinue producing the logo 17. At the same time, the fourth image 24 will rotate into its appropriate reconstruction range, and thus produce the logo 17 in substantially the same position and orientation as did the first image 18. The same type of reproduction of the logo 17 would then follow with the third exposure 22, and then the second exposure 20.

It can be appreciated that the hologram assembly 16 having the radially cut configurations in a disk provides a substantially identical exposure sequence. As depicted in FIG. 6, if the disk assembly 16 were rotating in a counterclockwise direction, the first image exposure 18' would be reconstructed, and then followed by the fourth exposure 24', the third exposure 22', and finally, the second exposure 20'. While the first exposure 18' is directly opposite the third exposure 22', only one of them will re-create an image, because of the methods of constructing the hologram which, among other things, relate to reference beam angular position, and existing pupil location and size, as is known in the art. The same selected recreation applies to the oppositely positioned second and fourth exposures 20', 24'.

As can also be appreciated, the number of hologram elements or exposure images can be altered according to the efficiency at which the logo 7 is sought to be produced. With fewer hologram elements or exposure images, the cost of production is lowered. On the other hand, as the number of hologram elements or exposure images increases, the clarity of the logo 17 is increased. A larger number of hologram elements or exposure images will reduce the amount of dead time that might exist between one exposure producing the image and the next successive exposure producing the image. Accordingly, a larger number of equally spaced exposures will substantially eliminate a strobe-type image that might otherwise result if very few exposures were used. This would allow image 17 viewing at slow speeds. Of course, as the speed of body 10 increases, the problem of dead time between re-creation decreases, and thus the image has less of an appearance of blinking. Preferably, for a body whose speed might vary between 0–100 revolutions per minute, 12 exposures can be used which are equally spaced apart in an angular direction.

Figure 3:
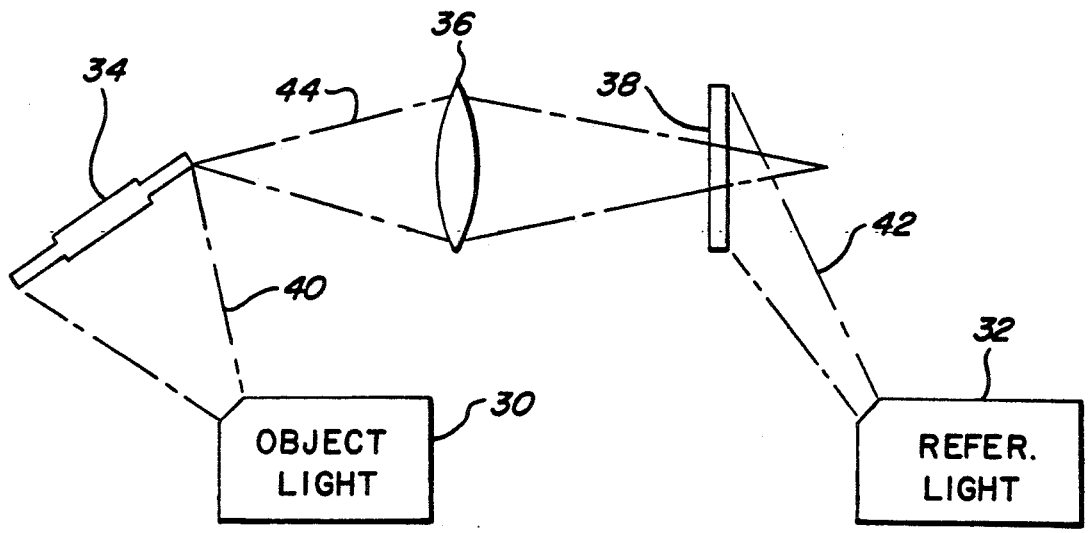
FIG. 3 depicts an exposure system for producing the hologram assembly according to the present invention.

Referring to FIG. 3, the hologram assembly 16 for the above embodiments may be constructed by illuminating an object 34 with an object light source 30. Illumination of the object 34 thereby produces reflected beam 44. A relay lens 36 can be used to focus the reflected beam 44 to a point past a photographic plate 38. At the same time, a reference light source 32 produces a reference beam 42 which produces an interference pattern at the photographic plate 38 with the reflected object beam 44. This is but one example of a conventionally-designed reflection-type hologram for use in the present invention. Artisans will understand that other methods could be appropriate for producing the holograms.

Figure 4:
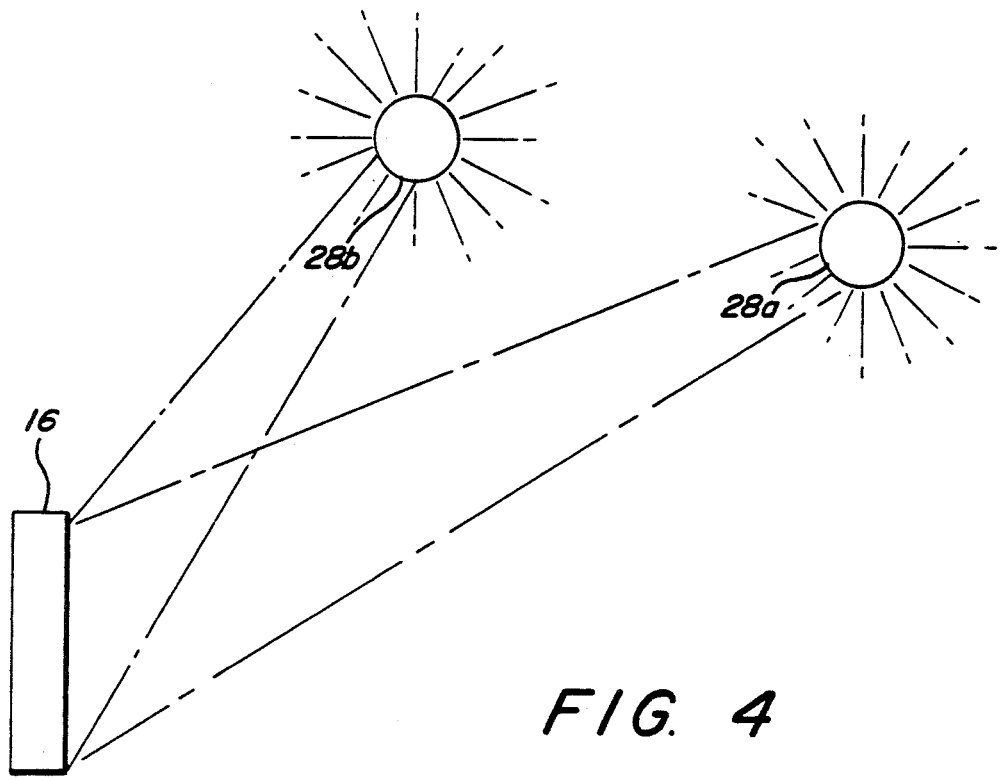
FIG. 4 depicts a moving illumination source of sunlight according to the present invention.

In the event that the hologram assembly 16 is to be illuminated only by the sunlight source 28, the illumination source position will probably continue to change throughout the day. Assuming for purposes of illustration that body 10 remains stationary, at an initial time $t_o$, the sunlight source 28 may be at a position indicated by reference numeral 28a in FIG. 4. At a time $t_n$, the sunlight source may be designated at a position indicated by reference numeral 28b. While the sunlight source 28 moves relative to the hologram assembly 16, an image 17 continues to be produced, as shown in FIG. 5. For example, when the sunlight source is at 28a, the image 17 produced is designated as 17a in FIG. 5. When the sunlight source is at 28b, the image 17 is designated in phantom lines in FIG. 5 as reference numeral 17b. As can be seen, the image continues to be produced as the sunlight source moves, although it is produced at a different point in time and, thus, its angular position simply changes.

In another embodiment of the present invention, rather than having the hologram assembly 16 composed of a plurality of identical exposures therein, the hologram assembly 16 includes different exposures. In this fashion, the hologram assembly 16 may then be made capable of producing what appears to be a moving image. For example, if it is desired that a running horse be produced, the multiple exposures or multiple hologram elements can include different images of a running horse in a single running cycle. Thereby, the successive illumination of the exposures produces an image of a horse running.

To protect the hologram assembly 16, a protective element (not shown) such as glass, mylar, polycarbonate, and other clear polymers can be affixed to the surface of the hologram assembly 16 which is exposed to the light source. It may be affixed by materials such as a heat-sealable adhesive, like polyvinyl butyral. In this way, the hologram assembly 16 is protected from foreign material that might otherwise become embedded in the hologram assembly 16 and blur the virtual image 17.

As shown from the above, the present invention provides an apparatus for producing a three-dimensional image that is stabilized relative to a rotating body. The stationary image can be seen from various angles while the disk is either stopped or moving.

The present invention includes a multitude of rotating devices that seek to provide a stabilized image. For example, a phonograph record could include a hologram assembly at the center thereof. The hologram assembly may provide a three-dimensional image of the artist as the record rotates. The illumination of the hologram assembly might be from a light source at the end of the needle arm. An advantage of this system for phonograph records is that the rotational speed of the records is known ahead of time (i.e., 33⅓ rpm). Therefore, the exact number of holograms needed to give a satisfactorily non-flickering image is easily determined. If the system were such that variable speeds could occur (such as for an automotive hubcap) some flicker might be noticed at slow speeds.

Another advantage of the phonograph record system is that viewing of the image can be restricted to a relatively small angular position. The viewer can move his head into the required position.

In operation, the viewer sees a holographic image in a certain eyebox. The image is two-dimensional only but if he moves his head so that his two eyes are in two different eyeboxes, he sees in stereo and the effective image is three-dimensional.

The above only describes certain preferred embodiments of the present invention, and it is contemplated that various modifications to the above can be effected, but nevertheless come within the scope of the present invention as defined by the claims.

What is claimed is:

1. In a rotating device, an improved image system, comprising:
    a reflection hologram assembly secured to said device, said hologram assembly having a plurality of exposures therein, each exposure capable of re-creating an image upon illumination of said hologram assembly as said rotating device rotates so that substantially only a single image is re-created at any one time, with no image processing optical element located between said hologram assembly and an observer, so that said image is directly viewable by an observer, wherein said system can be illuminated by a broad-band source of light.

2. The rotating device of claim 1 wherein the broad-band source of light is sunlight.

3. The rotating device of claim 1 wherein the broad-band source of light is an artificial light source.

4. In a rotating device, an improved image system, comprising:
    a reflecting hologram assembly secured to said device, said hologram assembly having a plurality of exposures therein, each exposure capable of re-creating an image upon illumination by sunlight of said hologram assembly as said rotating device rotates so that substantially only a single image is re-created at any one time; and
    wherein said system is directly viewable by an observer.

* * * * *